United States Patent [19]

Kim

[11] Patent Number: 5,623,572

[45] Date of Patent: Apr. 22, 1997

[54] DOUBLE-DECK VIDEOCASSETTE RECORDER

[75] Inventor: Sang-ook Kim, Suwon, Rep. of Korea

[73] Assignee: Samsung Electronics Co., Ltd., Kyungki-do, Rep. of Korea

[21] Appl. No.: 639,112

[22] Filed: Apr. 24, 1996

[30] Foreign Application Priority Data

Apr. 27, 1995 [KR] Rep. of Korea ...................... 95-10116

[51] Int. Cl.$^6$ ...................................................... H04N 9/79
[52] U.S. Cl. ..................................... 386/1; 386/4; 386/94
[58] Field of Search ..................................... 358/310, 335; 360/33.1, 13, 15; 348/705, 706; 386/1, 4, 94; H04N 9/79, 5/92, 5/76

[56] References Cited

U.S. PATENT DOCUMENTS

| | | | |
|---|---|---|---|
| 4,768,110 | 8/1988 | Dunlap et al. | 360/33.1 |
| 4,937,679 | 6/1990 | Ryan | 358/335 |
| 5,027,232 | 6/1991 | Sekii et al. | 360/74.1 |
| 5,057,934 | 10/1991 | Yun et al. | 358/335 |
| 5,124,807 | 6/1992 | Dunlap et al. | 358/316 |
| 5,177,618 | 1/1993 | Dunlap et al. | 358/335 |
| 5,194,963 | 3/1993 | Dunlap et al. | 358/314 |
| 5,216,552 | 6/1993 | Dunlap et al. | 360/33.1 |
| 5,239,420 | 8/1993 | Choi | 360/15 |
| 5,243,476 | 9/1993 | Hong | 360/73.02 |
| 5,249,084 | 9/1993 | Hong | 360/15 |
| 5,280,392 | 1/1994 | Koo | 360/15 |
| 5,323,243 | 6/1994 | Cheon | 358/335 |
| 5,331,474 | 7/1994 | Lee | 360/13 |
| 5,333,091 | 7/1994 | Iggulden et al. | 360/14.1 |
| 5,337,157 | 8/1994 | Nakata | 358/335 |
| 5,379,163 | 1/1995 | Lee | 360/69 |
| 5,386,325 | 1/1995 | Kim | 360/33.1 |
| 5,426,534 | 6/1995 | Nakata et al. | 360/15 |
| 5,455,718 | 10/1995 | Hong | 360/33.1 |
| 5,459,583 | 10/1995 | Nakata | 358/335 |
| 5,552,895 | 9/1996 | Kim | 358/310 |

*Primary Examiner*—Thai Q. Tran
*Assistant Examiner*—Vincent F. Boccio
*Attorney, Agent, or Firm*—Sughrue, Mion, Zinn, Macpeak & Seas

[57] ABSTRACT

A double-deck videocassette recorder (VCR) requires only one luminance/chrominance signal processor, rather than the two which are conventionally necessary for a double-deck VCR. The first deck has only a pickup head, whereas the second deck has both pickup and record heads. A first switching unit selects playback mode control signals from either the first deck servo or the second deck servo, to be provided to the single to the luminance/chrominance signal processor. The first switching unit also selects playback control signals from either the first deck system controller or the second deck system controller, to be provided to the single to the luminance/chrominance signal processor. A second switching unit selects either the luminance and color signals which are being played back from the first deck pickup head, or the luminance and color signals provided from the single luminance/chrominance processor, to be supplied to the second deck recording signal processor for recording on a tape using the second deck record head. A third switching unit selects between playback luminance and color signals supplied from the pickup heads of each deck for provision to the single luminance/chrominance signal processor. Each of the first, second and third switching units are under control of the first deck system controller. The first and second deck system controllers also control the servo systems for their respective decks.

9 Claims, 1 Drawing Sheet

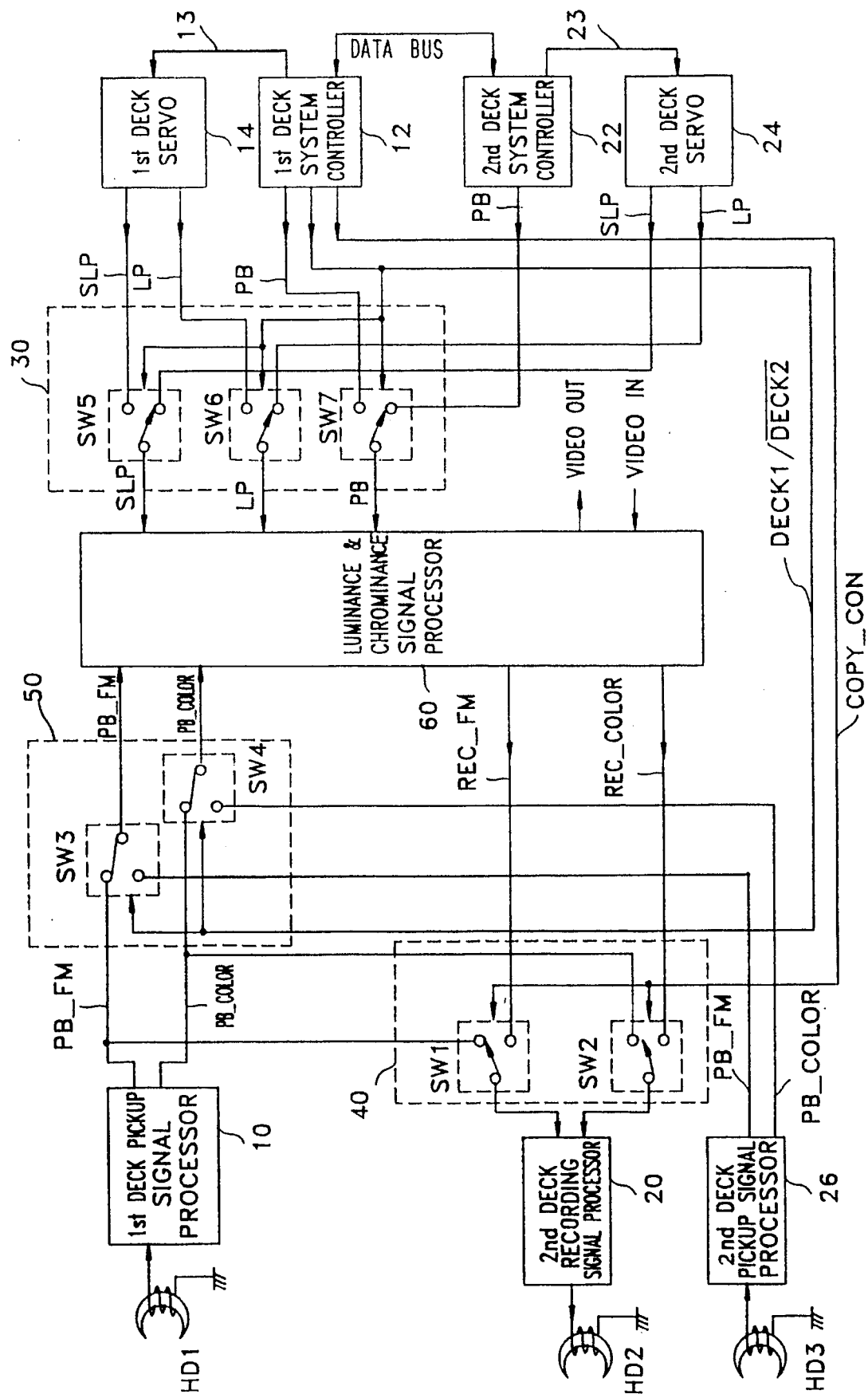

DOUBLE-DECK VIDEOCASSETTE RECORDER

BACKGROUND OF THE INVENTION

The present invention relates to a double-deck videocassette recorder, and more particularly, to a double-deck videocassette recorder having a single luminance/chrominance signal processor.

A double-deck videocassette recorder generally includes a pair of luminance/chrominance signal processors, for respectively processing the signals picked up from each deck or a composite video signal applied from external equipment. During the operation of such a double-deck videocassette recorder, however, since it is rare to operate (play or record on) two tapes simultaneously, one being loaded on each deck, only one of the processors is usually operated at any given time. Therefore, if the playback and recording functions for each deck could be accomplished by just one luminance/chrominance signal processor, the production cost of the manufactured device would be reduced.

SUMMARY OF THE INVENTION

It is, therefore, an object of the present invention to provide a double-deck videocassette recorder for carrying out the playback and recording functions of both decks with a single luminance/chrominance signal processor.

To achieve the above object, according to the present invention, there is provided a double-deck videocassette tape recorder with a first deck for playback and a second deck for playback and recording, comprising: first and second deck system controllers connected via a data bus for outputting playback mode signals for controlling the first and second decks, respectively; first and second servos for outputting playback mode control signals for determining a tape playback mode, according to the playback mode signals respectively output from the first and second deck system controllers; a first deck pickup signal processing unit for processing a pickup signal supplied from a playback head of the first deck, to output playback luminance and color signals; a second deck pickup signal processing unit for processing a pickup signal supplied from a playback head of the second deck, to output playback luminance and color signals; a second deck recording signal processing unit for processing recording luminance and color signals, to supply the processed signals to a recording head of the second deck; a luminance/chrominance signal processing unit for demodulating playback luminance and color signals, to output a composite video signal, and for alternatively modulating an input composite video signal, to output recording luminance and color signals; a second switching unit for selecting one of the playback luminance and color signals output from the first deck pickup signal processing unit and the recording luminance and color signals output from the luminance/chrominance signal processing unit, to then supply the selected signal to the second deck recording signal processing unit, according to a first control signal output from the first deck system controller; a third switching unit for selecting one of the playback luminance and color signals each output from the first and second deck pickup signal processing units, to then supply the selected signal to the luminance/chrominance signal processing unit, according to a second control signal output from the first deck system controller; and a first switching unit for selecting one of the playback mode control signals each output from the first and second servos and the playback mode signals each output from the first and second deck system controllers, according to the second control signal output from the first deck system controller, to then supply the selected signal to the luminance/chrominance signal processing unit.

BRIEF DESCRIPTION OF THE DRAWINGS

The above objects and advantages of the present invention will become more apparent by describing in detail a preferred embodiment thereof with reference to the attached drawing in which:

FIG. 1 is a block diagram showing a double-deck videocassette recorder according to the present invention.

DETAILED DESCRIPTION OF THE INVENTION

In FIG. 1, first and second deck system controllers 12 and 22 output control signals in accordance with input data supplied from a data input unit (not shown), e.g., a control panel. The output control signals from the deck system controllers control the overall operations of the first and second decks. The first and second deck system controllers 12 and 22 are connected to each other via a data bus.

First and second deck servos 14 and 24 are connected to the first and second deck system controllers 12 and 22 and a serial communication bus (SCB) via first and second servo control buses 13 and 23, respectively. The first and second deck servos 14, 24 are constructed to output playback mode control signals SLP and LP for determining a tape playback mode under the control of the first and second deck system controllers 12 and 22.

A first switching unit 30 is constituted by switches SW5 and SW6 for selecting the playback mode control signals (SLP or LP) each output from the first and second deck servos 14 and 24. The selection of playback mode by switches SW5 and SW6 is controlled by a second control signal (DECK1/DECK2) which is a deck selecting signal output from the first deck system controller 12. The first switching unit 30 also contains a switch SW7 for selecting playback (PB) mode signals output from the first and second deck system controllers 12 and 22. The first switching unit 30 supplies the selected signals (from each of switches SW5, SW6 and SW7) to the luminance/chrominance signal processor 60.

A second switching unit 40 is constituted by switches SW1 and SW2, and selects either the playback luminance and color signals (PB_FM or PB_COLOR) output from the first deck pickup signal processor 10, or the recording luminance and color signals (REC_FM or REC_COLOR) output from the luminance/chrominance signal processor 60. The selection of luminance and color signals by switches SW1 and SW2 is made according to a first control signal COPY_CON. COPY_CON is a copy control signal output from the first deck system controller 12. The second switching unit 40 supplies the selected luminance and color signals to the second deck recording signal processor 20.

A third switching unit 50 is constituted by switches SW3 and SW4 which select the playback luminance and color signals output from either the first deck pickup signal processor 10, or from the second deck pickup signal processor 26, respectively. The selection of playback signals is made according to the second control signal DECK1/DECK2 output from the first deck system controller 12. The third switching unit 50 the supplies the selected signal to the luminance/chrominance signal processor 60.

The operation of the system shown in FIG. 1 will now be described.

When the data necessary for recording a video signal output from external equipment onto a magnetic tape loaded on the second deck is input through a control panel (not shown), the switches SW1 and SW2 of the second switching unit 40 are switched in accordance with the level of the first control signal COPY_CON output from the first deck system controller 12 (e.g., the "low" state). In that case, the recording luminance and chrominance signals REC_FM and REC_COLOR output from the luminance/chrominance signal processor 60 are selected by the switches SW1 and SW2 to then be supplied to the second deck recording signal processor 20.

Here, the recording luminance and color signal is produced responsive to a composite sync signal (VIDEO IN) applied to the luminance/chrominance signal processor 60 from an external device (not shown). Thus, the video signal output from the external equipment is recorded through a recording head HD2 onto the magnetic tape loaded on the second deck.

Also, when command data for converting the modes of the first and second decks into a playback mode and a recording mode, respectively, is input, a first control signal COPY_CON having a level opposite to that of the above-described signal is supplied from the first deck system controller 12 to the switches SW1 and SW2 of the second switching unit 40. In response to the opposite level of the COPY_CON signal, the second switching unit 40 selects the playback luminance and chrominance signals (PB_FM or PB_COLOR) output from the first deck pickup signal processor 10 to the second deck recording signal processor 20, to then supply the selected signal to the second deck recording signal processor 20. As a result, the video signal picked up from the first deck is recorded onto the magnetic tape loaded on the second deck.

In the situation where the command data corresponding to the playback of video signals from the first and second decks is input, the first deck system controller 12 outputs the second control signal DECK1/$\overline{\text{DECK2}}$ which is a deck selection control signal.

As an example, if the data for reproducing the video data recorded on the magnetic tape loaded on the first deck is input, a logic "high" second control signal DECK1/$\overline{\text{DECK2}}$ is output from the first deck system controller 12, to then be supplied to the third switching unit 50. As a result, the switches SW3 and SW4 of the third switching unit 50 select the playback luminance and color signals picked up from a playback head HD1 and processed in the first deck pickup signal processor 10. The selected luminance and color signals from the processor 10 are thereby supplied to the luminance/chrominance signal processor 60. Accordingly, the video signal picked up from the magnetic tape loaded on the first deck is output (VIDEO OUT) for display.

As a contrary example, if the data for reproducing the video data recorded on the magnetic tape loaded on the second deck is input, a logic "low" second control signal DECK1/$\overline{\text{DECK2}}$ is output by controller 12. As a result, the third switching unit 50 selects the playback luminance and color signals picked up from a playback head HD3 of the second deck and processed in the second deck pickup signal processor 26. Thereby, third switching unit 50 supplies the selected playback signals of head HD3 to the luminance/chrominance signal processor 60. Accordingly, the video signal picked up in the magnetic tape loaded on the second deck is output (VIDEO OUT) for display.

In accordance with the input data (which is received, for example, from an external device), the playback modes of the tapes loaded on the first and second decks are thus determined by the operation of the switches SW5 and SW6 of the first switching unit 30 for selecting the SLP or LP data output from the first and second deck servos 14 and 24.

As described above, since the double-deck videocassette recorder according to the present invention can accomplish playing-back and copying operations with just one luminance/chrominance signal processor, the production cost is reduced and product miniaturization is facilitated.

The invention has been described according to a preferred embodiment. As will be appreciated by those skilled in the art, modifications may be made to the disclosed embodiment without departing from the spirit or scope of the invention.

What is claimed is:

1. A double-deck videocassette tape recorder with a first deck and a second deck, said double-deck videocassette tape recorder comprising:

first deck system controller for outputting a first playback mode signal for controlling said first deck, a first control signal and a second control signal;

second deck system controller for outputting a second playback mode signal for controlling said second decks, respectively;

first servo for outputting first playback mode control signals for determining a tape playback mode of said first deck in accordance with said first playback mode signal output from said first deck system controller;

second servo for outputting second playback mode control signals for determining a tape playback mode of said second deck in accordance with said second playback mode signal output from said second deck system controller;

a first deck playback head;

a second deck playback head;

a second deck recording head;

a luminance/chrominance signal processing unit for demodulating playback luminance and color signals to output a composite video signal, and for, alternatively, modulating an input composite video signal, to output luminance and color signals for recording;

a first switching unit for selecting either said first playback mode control signals or said second playback mode control signals as selected playback mode control signals, and for selecting either said first playback mode signal or said second playback mode signal as a selected playback mode signal, to then supply the selected playback mode control signals and the selected playback mode signal to said luminance/chrominance signal processing unit, wherein the selecting by said first switching unit is done according to said second control signal output from said first deck system controller;

a second switching unit for selecting either playback luminance and color signals produced by said first deck playback head, or said luminance and color signals for recording, output from said luminance/chrominance signal processing unit, as a second switch unit selected signal, to then supply the second switch unit selected signal to said second deck recording head, wherein the selecting by the second switching unit is done according to said first control signal output from said first deck system controller; and a third switching unit for selecting either said playback luminance and color signals produced by said first deck playback head, or playback and color signals produced by said second deck playback head, as a third switching unit selected signal, to then supply the third switching unit selected signal to said luminance/chrominance signal processing unit, wherein the selecting by the third switching unit is done according to said second control signal output from said first deck system controller.

2. The double-deck videocassette tape recorder according to claim 1, wherein said first control signal is a copy control signal.

3. The double-deck videocassette tape recorder according to claim 1, wherein said second control signal is a deck select signal.

4. The double-deck videocassette tape recorder according to claim 1, further comprising:

a first deck pickup signal processing unit for processing a pickup signal supplied from said first deck playback head, to output playback luminance and color signals to said second switching unit and to said third switching unit.

5. The double-deck videocassette tape recorder according to claim 1, further comprising:

a second deck pickup signal processing unit for processing a pickup signal supplied from said second deck playback head, to output playback luminance and color signals to said third switching unit.

6. The double-deck videocassette tape recorder according to claim 1, further comprising:

a second deck recording signal processing unit for processing the second switch unit selected signal, to supply the processed signal to said second deck recording head.

7. A double-deck videocassette tape recorder with a first deck for playback and a second deck for playback and recording, comprising:

first and second deck system controllers connected via a data bus for outputting playback mode signals for controlling said first and second decks, respectively;

first and second servos for outputting playback mode control signals for determining a tape playback mode, according to said playback mode signals respectively output from said first and second deck system controllers;

a first deck pickup signal processing unit for processing a pickup signal supplied from a playback head of said first deck, to output playback luminance and color signals;

a second deck pickup signal processing unit for processing a pickup signal supplied from a playback head of said second deck, to output playback luminance and color signals;

a second deck recording signal processing unit for processing recording luminance and color signals, to supply the processed signals to a recording head of said second deck;

a luminance/chrominance signal processing unit for demodulating playback luminance and color signals, to output a composite video signal, and for alternatively modulating an input composite video signal, to output recording luminance and color signals;

a second switching unit for selecting one of said playback luminance and color signals output from said first deck pickup signal processing unit and said recording luminance and color signals output from said luminance/chrominance signal processing unit, to then supply the selected signal to said second deck recording signal processing unit, according to a first control signal output from said first deck system controller;

a third switching unit for selecting one of said playback luminance and color signals each output from said first and second deck pickup signal processing units, to then supply the selected signal to said luminance/chrominance signal processing unit, according to a second control signal output from said first deck system controller; and a first switching unit for selecting one of said playback mode control signals each output from said first and second servos and for selecting one of said playback mode signals each output from said first and second deck system controllers, according to said second control signal output from said first deck system controller, to then supply the selected signal to said luminance/chrominance signal processing unit.

8. The double-deck videocassette tape recorder according to claim 7, wherein said first control signal is a copy control signal.

9. The double-deck videocassette tape recorder according to claim 7, wherein said second control signal is a deck select signal.

* * * * *